WILLIAM H. SINGER, OF PITTSBURG, PENNSYLVANIA.

Letters Patent No. 85,140, dated December 22, 1868.

IMPROVED METHOD OF APPLYING CAST-STEEL TO ARTICLES MADE OF IRON.

The Schedule referred to in these Letters Patent and making part of the same.

*To all whom it may concern:*

Be it known that I, WILLIAM H. SINGER, of Pittsburg, in the county of Allegheny, and State of Pennsylvania, have invented a new and improved Method of Applying Cast-Steel to Articles of Iron; and I do hereby declare that the following is a full, clear, and exact description thereof, which will enable those skilled in the art to make and use the same.

This invention relates to an improvement in making "iron-centre," "iron-face," or "iron-back" "cast-steel," whereby, for the uses for which steel is intended, the articles are equal to pure steel.

As such steel has heretofore been made, the iron which forms centre, back, or face has been merely heated, and placed in the mould, with the surface, of course, oxidized, or covered with scale, to a greater or less extent, which scales separate from the iron, and mingle with the molten steel, causing imperfections therein of a very serious nature.

My method is to thoroughly cleanse the iron in an acid-bath, where it is allowed to remain a sufficient length of time, when it is taken out of the bath, and placed in a lime-bath, for the purpose of destroying any acid which might remain on the iron.

From the lime-bath the iron is placed in the mould, in a cold state, and the melted steel is poured around or in contact with it, as may be desired.

By this method, the steel is kept clean and pure, while the expense of the process is materially lessened.

I claim as new, and desire to secure by Letters Patent—

The method of applying cast-steel to iron, substantially as herein described.

The above specification of my invention signed by me, this    day of    , 1868.

WILLIAM H. SINGER.

Witnesses:
HENRY P. FORD,
G. BRUCE HARTON.